United States Patent [19]

Trundle

[11] Patent Number: 5,026,619
[45] Date of Patent: Jun. 25, 1991

[54] REVERSIBLE INFRA-RED RECORDING MEDIUM

[75] Inventor: Clive Trundle, Towcester, England

[73] Assignee: Plessey Overseas Limited, Essex, England

[21] Appl. No.: 341,098

[22] PCT Filed: Jul. 20, 1988

[86] PCT No.: PCT/GB88/00587
§ 371 Date: Mar. 24, 1989
§ 102(e) Date: Mar. 24, 1989

[87] PCT Pub. No.: WO89/01220
PCT Pub. Date: Feb. 9, 1989

[30] Foreign Application Priority Data

Jul. 24, 1987 [GB] United Kingdom ................ 8717619

[51] Int. Cl.$^5$ ............................ G03C 1/73; G11B 7/24
[52] U.S. Cl. ..................................... 430/19; 430/332; 430/338; 430/346; 430/495; 430/944; 430/945; 430/962
[58] Field of Search ............... 430/332, 338, 343, 346, 430/270, 495, 945, 944, 962, 19

[56] References Cited

U.S. PATENT DOCUMENTS 4,220,708  9/1980  Heller ................................... 430/336
4,529,684  7/1985  Sasagawa et al. .
4,720,449  1/1988  Borror et al. ......................... 430/338
4,737,449  4/1988  Heller et al. ......................... 430/343

FOREIGN PATENT DOCUMENTS 0014046  1/1980  European Pat. Off. .
0190016  1/1986  European Pat. Off. .
0193931  3/1986  European Pat. Off. .
2823341  5/1979  Fed. Rep. of Germany .

OTHER PUBLICATIONS

Proceedings of SPIE–"Optical Storage Media", vol. 420, Alan E. Bell et al, Jun. 1983, pp. 186–193.

Primary Examiner—Charles L. Bowers, Jr.
Assistant Examiner—Mark R. Buscher
Attorney, Agent, or Firm—Sughrue, Mion, Zinn, Macpeak & Seas

[57] ABSTRACT

The invention relates to an optical data recording method which comprises addressing a recording device using an infra-red laser modulated with a waveform of the information to be recorded, wherein said recording device comprises an infra-red absorbing material and a photochromic fulgide which is converted into its colored form under the influence of the heat absorbed from the laser, and updating the recording by erasing undesired previously recorded data using a laser operation in the visible region of the spectrum.

6 Claims, No Drawings

REVERSIBLE INFRA-RED RECORDING MEDIUM

This invention relates to an up-dateable infra-red recording medium and to a method of recording data and erasing previously recorded data using infra-red and visible lasers.

Infra-red lasers (e.g. Ga Al As) have advantages for data recording purposes of being cheap and efficient. Proposals have been made to record data onto a variety of recording media using such lasers to physically burn small holes in the surface of the media. The shape and size of the holes in the recording media enable the information to be read out with a visible light laser—see, for example, the paper by Jipson and Jones in J. Vac. Sci. Technol. 18(1) Jan/Feb 1981, page 105). Such ablative recording methods have the disadvantage that the recording cannot be updated and is useful only for archival storage of information. Nevertheless, the high storage density of optical recording methods gives the system considerable potential.

An infra-red recording system which enables the information to be up-dated would have significant additional attractions.

According to one aspect of the present invention there is provided an optical data recording method which comprises addressing a recording device using an infra-red laser modulated with a waveform of the information to be recorded, wherein said recording device comprises an infra-red absorbing material and a photochromic fulgide which is converted into its coloured form under the influence of the heat absorbed from the laser, and updating the recording by erasing undesired previously recorded data using a laser operating in the visible region of the spectrum.

The photochromic fulgides (including fulgimides) and lactones which can be made responsive to infra-red radiation have the general formula (I) or (II) below, said fulgide or lactone being convertible to a coloured form by heat;

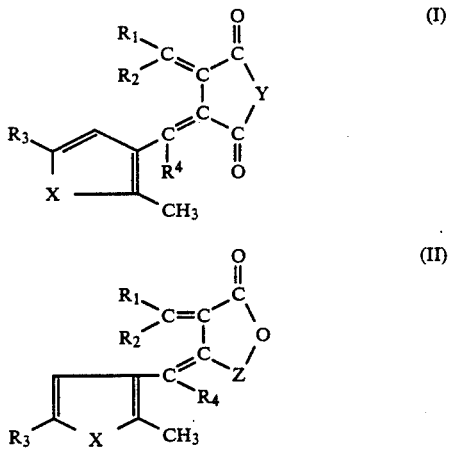

wherein
X represents oxygen or sulphur;
Y represents oxygen or N—A, (where A is alkyl, aryl or aralkyl), one of $R_1$ and $R_2$ is hydrogen while the other is alkyl or aryl, $R_3$ is hydrogen, alkyl or aryl and $R_4$ is alkyl or aryl and Z is methylene or a dialkyl substituted methylene.

It is an important feature of the compounds of formula (I) and (II) that one of the groups represented by $R_1$ and $R_2$ is hydrogen, while the other is alkyl or aryl. This is believed to give the heat-responsive colour change properties. Other groups represented by $R_3$ and $R_4$ in the general formulae are not critical. However, alkyl groups preferably contain 1 to 6 carbon atoms (especially 1 to 4 or 5 carbon atoms) and aryl groups are preferably phenyl groups or substituted phenyl groups (e.g. substituted with alkyl having 1 to 5 carbon atoms).

Photochromic fulgides and fulgimides of general formula (I) are converted to a red or blue coloured state. The reversible conversion to the coloured, cyclised state (IA) is indicated below:

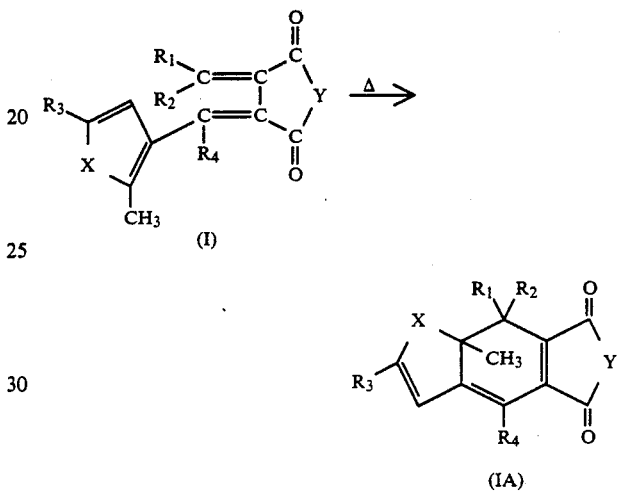

In the case of the lactones, the colourless form undergoes a similar reversible conversion to a coloured, cyclised state, although the coloured form is yellow.

The photochromic fulgides and lactones of general formulae (I) and (II) may be prepared by the methods described in U.K. Patent No. 1464603 and U.K. Patent Application No. 87 12902 (Publication No. 2,191,195).

A recording medium or device is prepared by mixing the selected photochromic fulgide or lactone with an infra-red absorbing material. The infra-red absorber should be one which does not strongly absorb in the visible region of the spectrum but absorbs strongly in the region of 800 nm and above, preferably above 1000 nm.

Suitable infra-red absorbers are described in E.P.A. No. 155780 (I.C.I). These compounds are poly (substituted) phthalocyanines which may be complexed to a group VB or VIB atom, such as lead, nickel or cobalt.

Other examples of infra-red absorbers include the squarylium compounds described in the Jipson and Jones paper referred to above.

A range of suitable infra-red absorbers are manufactured by Mitsui Toatsu Chemicals under the trade names PA-1001, PA 1003 and PA 1005. These compounds absorb strongly in the range above 800 nm and are metal complexes of halogen-substituted o-benzenedithiols. U.S. Pat. No. 4,508,655 describes these metal complexes and their method of preparation. They have the following general formula:

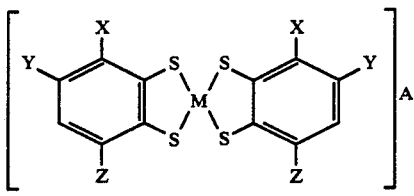

wherein X represents a chlorine or bromine atom, Y and Z each represent a hydrogen or chlorine atom when X is a chlorine atom or they each represent a hydrogen or bromine atom when X is a bromine atom, M represents a nickel, palladium or platinum atom, and A represents a quaternary ammonium group.

They are compatible with resins such as polymethyl methacrylate (PMMA), and polyvinyl chloride (p.v.c.) and soluble in organic solvents such as dimethylformamide, ethyl cellosolve (2-ethoxy ethyl acetate) and methyl ethyl ketone.

Preferably, the infra-red absorbers are used in an amount of from about 2 to 20% by weight of the photochromic compound, especially from about 3 to 16%. Various techniques and apparatus may be employed for recording and read-out of information stored on the recording media produced in accordance with this invention. The optical equipment (including lasers) for recording and read-out as described in the above-mentioned Jipson and Jones paper or in the paper entitled 'Digital Optical Recording in Infra-Red Sensitive Organic Polymers' by Dennis G. Howe and Alan B. Marchant, Proceedings of the International Society of Optical Engineering, 1983, volume 382, pages 103 to 115 may be employed. Alternatively, we may use the holographic recording technique described in U.S. Pat. No. 4,186,002, modified by substitution of an infra-red laser for writing in the data. Other suitable apparatus and techniques are described in the paper by Howe and Wrobel entitled 'Laser Marking of Thin Organic Films', and published in Applied Physics Letters 1982, volumne 40, No. 11, pages 982–930.

A recording device for use in the present invention may be prepared by preparing a solution of the selected infra-red absorber and photochromic fulgide and a resin in a suitable common solvent and depositing the solution on a substrate to form a thin film. Suitable resins include Novolac resins and polymethyl methacrylate (PMMA). An example of the preparation of a typical recording device is as follows:

Z-phenylmethylidene-E-2-methyl-5-phenyl-3-furylethylidene succinic anhydride (General formula (I), $R_1=R_3=Ph$, $R_2=H$, $R_4=Me$) (3 grms) was dissolved in a solution of DMF or 2-ethoxy ethyl acetate containing 10 grms of PMMA and the infra-red absorber supplied by Mitsui Toatsu Chemicals Inc. of Japan under the trade name PA 1001 (0.1–0.5g). The solution is then filtered (0.5 um) and coated onto a suitable substrate e.g. glass or PMMA substrate by spinning at 5000 rpm for 40 secs. The film produced is dried by heating at 40°–100° C. until dry.

I claim:

1. An optical data recording method which comprises addressing a recording device using an infra-red laser modulated with the information to be recorded, wherein said recording device comprises an infra-red absorbing material and a photochromic fulgide or lactone having the general formula (I) and (II) below, said fulgide or lactone being convertible to a coloured form by heat;

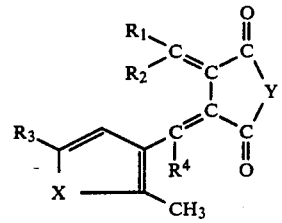

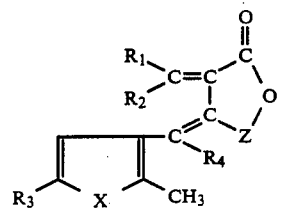

wherein

X represents oxygen or sulphur;

Y represents oxygen or N—A, (where A is alkyl, aryl or aralkyl), one of $R_1$ and $R_2$ is hydrogen while the other is alkyl or aryl, $R_3$ is hydrogen, alkyl or aryl and $R_4$ is alkyl or aryl and Z is methylene or a dialkyl substituted methylene.

2. A method according to claim 1 in which one of $R_1$ and $R_2$ is hydrogen and the other is an alkyl group having 1 to 4 carbon atoms, phenyl or a substituted phenyl group, $R_3$ is hydrogen, phenyl or an alkyl group having 1 to 4 carbon atoms, and $R_4$ is an alkyl group having 1 to 4 carbon atoms or a phenyl group.

3. A method according to claim 1 or claim 2, which includes the step of erasing unwanted previously recorded data using a laser emitting radiation in the visible region of the spectrum.

4. An optical recording device suitable for recording data using an infra-red laser for writing data to the device, said device comprises a substrate having coated thereon or incorporated therein an infra-red absorbing material and a photochromic fulgide or lactone having the general formula (I) or (II) below, said fulgide or lactone being convertible to a coloured form by heat;

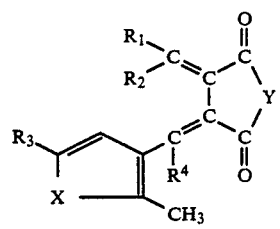

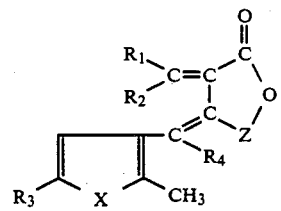

wherein

X represents oxygen or sulphur;

Y represents oxygen or N—A, (where A is a alkyl, aryl or aralkyl), one of $R_1$ and $R_2$ is hydrogen while the other is alkyl or aryl, $R_3$ is hydrogen, alkyl or aryl and $R_4$ is alkyl or aryl and Z is methylene or a dialkyl substituted methylene.

5. A recording device according to claim 4 in which the infra-red absorbing material and the photochromic fulgide or lactone are coated onto a substrate from a solution containing a resin.

6. A recording device according to claim 5 in which the resin is a novolac resin or polymethylmethacrylate.